Feb. 27, 1945.  T. THORSTEN ET AL  2,370,207
APPARATUS FOR THE DISPOSITION OF FLUE DUST AND THE LIKE
Filed Dec. 4, 1940  2 Sheets-Sheet 1
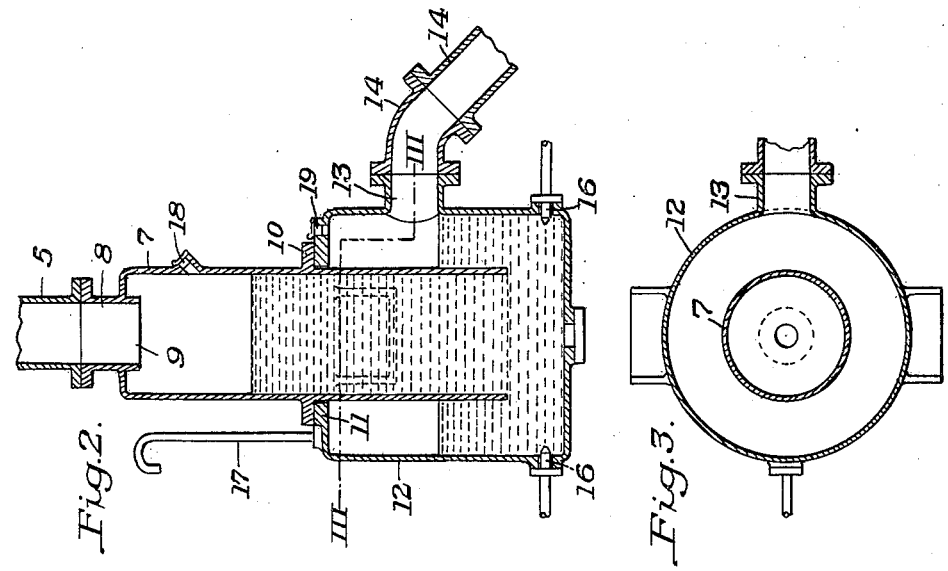
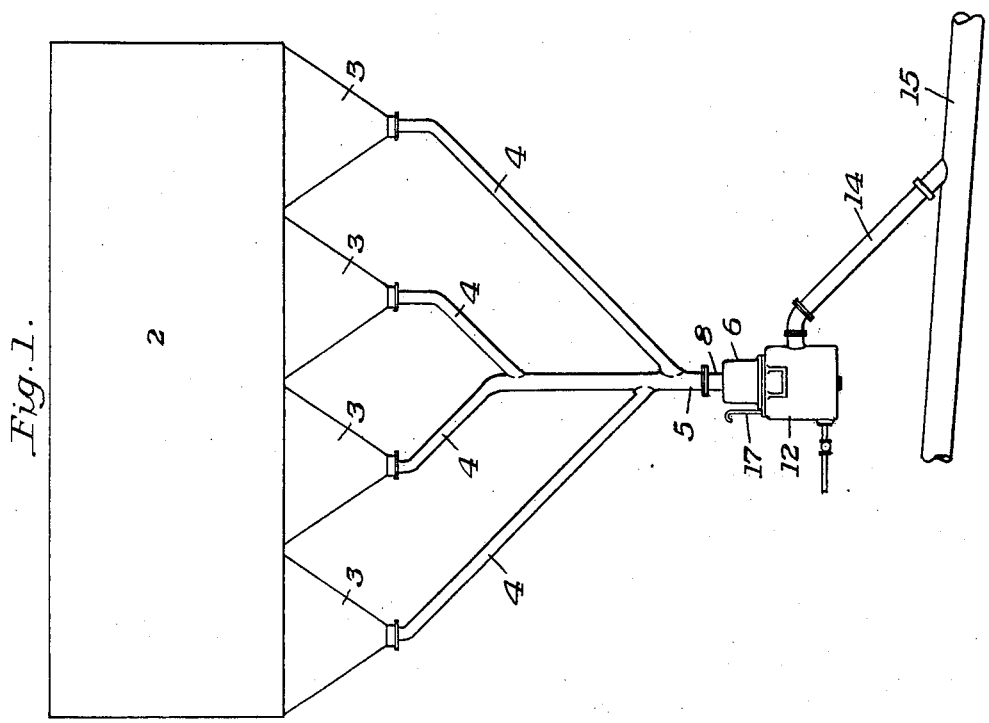
INVENTORS
THORLEIF THORSTEN
JOHN E. GEUE
ROLLAND F. KELLOGG, Sr.
by Christy, Parmelee and Strickland
their attorneys Feb. 27, 1945.  T. THORSTEN ET AL  2,370,207
APPARATUS FOR THE DISPOSITION OF FLUE DUST AND THE LIKE
Filed Dec. 4, 1940  2 Sheets-Sheet 2
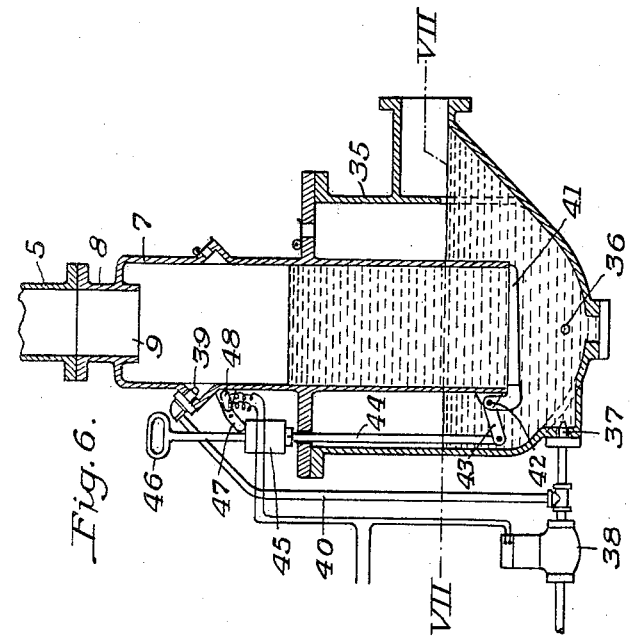
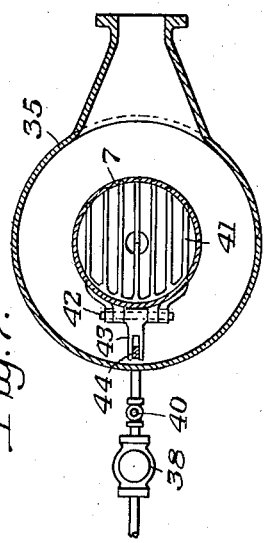
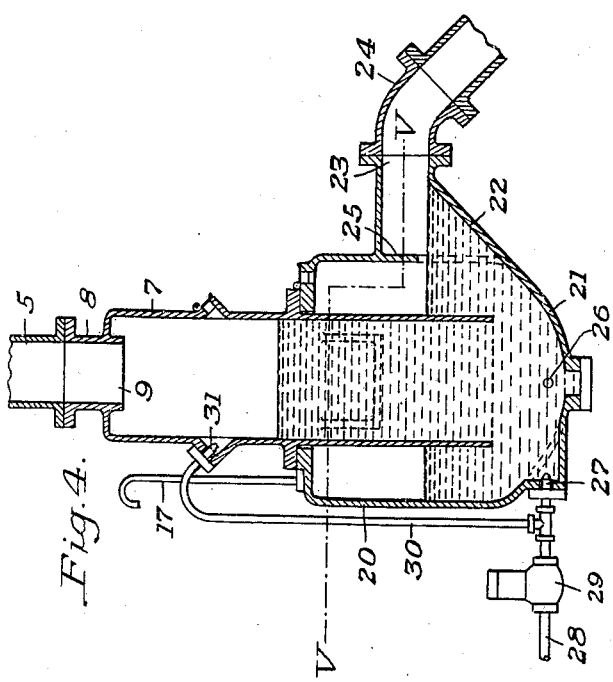
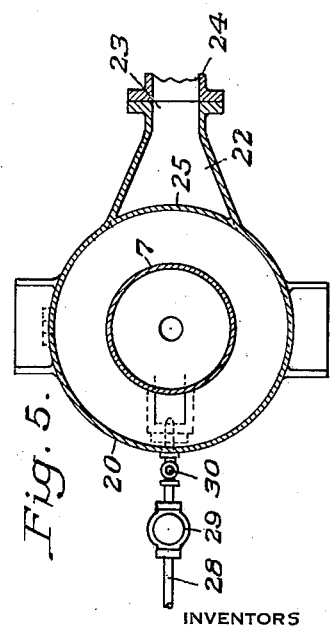
INVENTORS
THORLEIF THORSTEN
JOHN E. GEUE
ROLLAND F. KELLOGG, Sr.
by Christy, Parmelee and Strickland
their attorneys Patented Feb. 27, 1945

2,370,207

UNITED STATES PATENT OFFICE 2,370,207

APPARATUS FOR THE DISPOSITION OF FLUE DUST AND THE LIKE

Thorleif Thorsten, Pittsburgh, Pa., and John E. Geue and Rolland F. Kellogg, Sr., Power, W. Va.

Application December 4, 1940, Serial No. 368,494

11 Claims. (Cl. 302—15)

This invention pertains to a method and apparatus for the treatment of flue dust or other industrial dust, and pertains particularly to the treatment of dust after it has been collected in dust collectors or separators.

In the burning of powdered coal, for example, large quantities of dust or fine ash are entrained with the flue gases. To remove the bulk of these entrained particles from the gases the flue gases are circulated through some kind of a separator before being discharged into the flue. The dust collectors, being connected between the boiler and the flue, operate at a vacuum equal to several inches of water. Various kinds of apparatus have been developed for removing the dust which collects in the dust collectors. Most systems involve the use of a suction pump which draws flue gases from the dust collector and this gas is used as a medium for carrying the collected dust to a point of disposition. This requires a second separating operation where the dust is again separated from the stream of flue gases. At this second separator the dust is precipitated usually into some closed receptacle where it is wet with water and discharged into a railroad car as a thick paste or otherwise carried away for disposition.

All such systems are expensive to install and to maintain. The pump for removing some of the flue gases from the dust separator must create a vacuum greater than the vacuum which exists in the dust collector. The gases being withdrawn from the dust collector are ordinarily at a relatively high temperature, being in the neighborhood of 400° F. The flue gases themselves are highly corrosive, and the destructive action of the gases is increased by the abrasive action of the dust particles being carried at high velocity from the dust collector to the separator. In order to resist this corrosive and abrasive action special alloys are usually employed for the pipe through which the dust and hot gases are carried. Altogether these installations cost many thousand dollars and involve considerable expense for their operation and maintenance.

According to the present invention there is provided a method and apparatus in which the dust is disposed of primarily by gravity and which does not at any point require the circulation of flue gases through the dust disposal system for moving the dust. The present invention provides a method and apparatus which involves no complicated equipment, which is much simpler to install and maintain than present systems, and the maintenance cost of which is very low due to the fact that the hot flue gases themselves are at no time circulated through the dust disposal apparatus.

In the practice of the present invention the dust which is precipitated in the dust collector flows by gravity into a bell, the lower end of which is immersed in water. As the dust falls onto the water it becomes wet, sinks to the bottom and is carried away in suspension, the water at the same time sealing the discharge end of the bell so as to prevent the flow of atmospheric air through the pipe or pipes leading from the dust collector back into the dust collector.

Our invention may be fully understood by reference to the accompanying drawings which illustrate certain preferred embodiments of our invention and in which—

Figure 1 is a more or less schematic elevational view showing the general arrangement of a dust disposal system embodying our invention;

Figure 2 is a transverse vertical section through the dust evacuating unit;

Figure 3 is a horizontal section in substantially the plane of line III—III of Figure 2;

Figure 4 is a view similar to Figure 2 of a modified form of evacuating unit intended for use where some of the solid particles may be in the form of small cinders or are otherwise too heavy to be carried away by the apparatus shown in Figure 1;

Figure 5 is a horizontal section in the plane of line V—V of Figure 4;

Figure 6 is a view similar to Figure 4 of a still further modification; and

Figure 7 is a transverse horizontal section in the plane of line VII—VII of Figure 6.

Referring to Figure 1, 2 designates an apparatus for precipitating solids from gases. For the purpose of describing the present invention the unit 2 may be regarded as a dust collector in the flue leading from the boiler in which powdered coal is being burned. The dust collector is provided with one or more pockets or hoppers 3 at the bottom thereof into which the dust and solids which separate from the gases fall. Leading from the bottom of each of the pockets 3 is a pipe 4. The inclination of the pipes 4 is such that the dust and solids will fall through them freely by gravity. All of the pipes 4 converge in a common pipe or duct 5. The duct 5 leads into the top of a dust evacuating unit which is designated generally as 6.

Referring to Figures 2 and 3, one simple form of the evacuating unit is illustrated. The evacuating unit shown in these figures comprises a bell 7 in the form of a cylinder open at its lower end and having a flanged coupling 8 at the top thereof of a diameter less than the diameter of the bell and which is connected to the bottom of the duct 5. The flanged coupling 8 preferably projects through the top of the bell and extends down into the bell a short distance below the top, as indicated at 9.

The bell is provided intermediate its top and bottom with a lateral flange 10 by means of which the bell is supported on the inturned upper end 11 of a receptacle 12. The receptacle 12 is of substantially larger diameter than the bell 7. The lower end of the bell 7 extends down into the receptacle 12 close to the bottom of the receptacle but is spaced away from the bottom.

Formed on the side of the receptacle 12 intermediate the top and bottom is a flanged projection or coupling 13 forming an overflow outlet for the receptacle and to which a drain pipe 14 is connected. As shown in Figure 1 the drain pipe 14 is sloped downwardly away from the receptacle at a rather steep angle. It carries the overflow from the evacuating vessel to any suitable point of disposal. In Figure 1 the pipe 14 is shown as leading into a main discharge pipe or sewer 15.

Near the bottom of the receptacle 12 are one or more water injection nozzles 16. Two of them are illustrated but one is normally sufficient and any desired number may be employed. These nozzles are arranged to project a stream of water across the bottom of the receptacle under the lower end of the bell 7 and to keep the water in the receptacle in a state of constant agitation. Under some circumstances, as for example where the water pressure to one of the nozzles is insufficient to agitate the water, air under pressure may be supplied through one nozzle 16 while water is supplied to the other. The receptacle is shown as having a central cleanout port at the bottom thereof and it is also provided with a vent opening or vent pipe 17 which opens to the atmosphere. One or more inspection openings with appropriate covers are provided, two of them being shown, one at 18 and one at 19.

Since the top of the bell is in communication through the duct 5 and the pipes 4 and the pockets 3 with the interior of the dust collector 2, there is a constant partial vacuum in the top of the bell 7 as long as the unit is in operation. This partial vacuum causes water from the receptacle 12 to be drawn up into the bell to approximately the level indicated in Figure 2. This water level is well below the top of the bell but is well above the outlet port 13 in the side of the receptacle. The receptacle 12 is of sufficiently large capacity that when it is first filled with water to the level of the overflow and the boiler is started up there will be an adequate reservoir of water for the water to rise to the level indicated in Figure 2 without the lower end of the bell being opened to atmosphere. This receptacle also has sufficient capacity so that if the boiler is shut down allowing the column of water in the bell 7 to drop faster than it can be carried out of the overflow the excess can be received within the receptacle.

In the operation of the system the nozzle or nozzles 16 are turned on to supply the receptacle 12 with water and the receptacle is filled to the level of the overflow port. When the boiler is put under operation and a partial vacuum established in the upper part of the bell the column of water will rise in the bell to the level indicated. The nozzles will continue to supply water to the receptacle and after the receptacle is filled to the level of the overflow a continuous stream of water will be discharged from the overflow. The dust or other solids drop to the top of the bell. They have a tendency to float on top of the water but as the mass of solids at the top increases the particles resting on the water are forced down into the water where they become wet and sink to the bottom of the receptacle. The jets of water sweeping across the bottom of the receptacle 12 prevent the sedimentation of these particles on the bottom of the receptacle and the particles are kept in suspension in the water. As the water overflows it carries away the suspended particles and the particles are thus conveyed to their point of ultimate disposal. Sufficient water is supplied to the receptacle through the nozzles that the discharge from the overflow is in the nature of a highly fluid stream with the particles in suspension, it being desirable to prevent the mass from becoming pasty. The water which is carried off through the drain may run, for example, onto a cinder pile where the fine material may be deposited in with the cinders or it may run into a settling tank and the solids then removed from the settling tank by a grab bucket or other appropriate conveying means. The water seal at the lower end of the bell prevents any back-flow of atmospheric air through the dust conduits 5 and 4 into the bottom of the dust collector. Likewise it will be instantly recognized that there is no flow of hot gases through the pipes 4 and 5 and that only the solids move by gravity through these pipes. Moving as the dry dust particles do, by gravity, at relatively slow velocity, their abrasive action is negligible and ordinary steel pipe may be used for this purpose in place of the expensive alloys heretofore required in similar locations. All of the dust is discharged into the water. There is no necessity for any exhaust fan or for any separator and washer, such as is required in other methods of handling the same materials. The flotation of the solids from the evacuating unit in a stream of water provides a simple way of carrying the material at slow velocity to a place of ultimate disposition and the particles being transported suspended in water in this manner have a minimum abrasive effect.

The system operates continuously and automatically as long as the boiler is in operation. Complicated valve mechanisms of the type now generally used at the bottom of the dust collecting hoppers are not required. Once the system is properly adjusted to the operation of the boiler it requires no supervision or labor for its sustained operation. The bell 7 is preferably made of a larger diameter than the duct 5 through which the material is introduced into the water in order that the solid materials will definitely drop clear of the duct before coming into contact with the water. Where the dust lies against a metal surface there may be a capillary flow of water up the sides of the duct and if the end of the pipe 5 were carried down into the water without there being an intervening chamber of larger diameter provided by the interior of the bell, stoppage of the discharge pipe would be more likely. The arrangement prevents any capillary action which would be conducive to the clogging of the discharge of solids and provides an area of water onto which the dust falls sufficiently large that solids cannot become bridged across the top of the water.

In some installations the solids being discharged into the evacuating unit may be of a size or weight such that they would tend to settle out of suspension in the receptacle and they would not therefore be removed by the current of water which normally discharges from the overflow of the receptacle. The construction shown in Figures 4 and 5 may be used where such condition is encountered. In this construction the duct 5 opens into the top of the bell 7 in the same way as described in connection with Figures 2 and 3 and the bell is of similar construction and similar reference numerals have been used. Instead of the bell discharging into a cylindrical receptacle as described in connection with Figures 2 and 3, the receptacle 20 is provided with a rounded bottom 21. At one side of the receptacle there is an inclined trough or projection 22 sloping upwardly and outwardly from the bottom and terminating in an outlet port 23 to which the drain pipe 24 is coupled. The wall of the receptacle over the trough 22 is provided with a depending baffle 25 which terminates just slightly above the normal water level in the receptacle, this water level of course being defined by the level of the outlet 23. In addition to a nozzle 26 corresponding to the nozzle 16 of Figure 2, there is also provided in the receptacle near its bottom a high pressure flushing nozzle 27. This nozzle is preferably disposed diametrically opposite the sloped offset 22 so that the nozzle 27 projects a stream of water across the bottom of the receptacle under the bell and up the inclined surface 22 to the outlet port. The nozzle 27 is connected with a source of water supply 28 through an intermittently operated valve 29. This valve is shown as being a solenoid-actuated valve. It is contemplated that the solenoid would be energized at regular time intervals by any known and preferred circuit closer and at intervals of time adjusted to the rate at which solids are discharged into the evacuating receptacle. There may also be a branch pipe 30 leading from the discharge side of the solenoid valve upwardly to a point just above the normal water level in the bell, this pipe terminating in a nozzle 31 that opens into the bell. The arrangement is such that when water is supplied to the nozzle 27 it is also discharged from the nozzle 31.

In the operation of this device the nozzle 26 preferably operates continuously, keeping the water in the receptacle at the proper level and maintaining the water in a state of agitation and floating away the dust particles that are held in suspension, all as previously described. At intervals of time additional water is supplied through the nozzles 27 and 31. This additional supply of water serves to sweep larger solids which may have settled in the bottom of the receptacle up the inclined offset 22 to the mouth of the drain pipe. The action of this nozzle tends to create a surge of water in the outlet 23 so that the water level rises above the lower edge of the baffle 25. Then as the water flows down the drain pipe 24 a draft action is created tending to siphon the water out of the receptacle, flushing away the accumulated solids, the operation being comparable to that of the conventional commode. When sufficient water has been removed to permit air to flow under the baffle 25 the draft or siphon action will be broken and at about this time the flushing valve 27 will close. The water level in the receptacle is never flushed to a point below the lower end of the bell 7. While the nozzle 31 is optional and does not need to be used, it is desirable, first, for wetting the solids that may be floating on top of the water, and, second, for breaking up any accumulations that may tend to form in the bell.

The modifications shown in Figures 6 and 7 pertain to the form of device described in connection with Figures 4 and 5. In the arrangement shown in Figures 4 and 5 it is contemplated that the solenoid-actuated valve 29 shall be periodically operated. In the arrangement shown in Figures 6 and 7 means is provided within the evacuating unit for controlling the solenoid valve through the accumulation of material in the unit itself. In the arrangement shown in Figures 6 and 7, 5 again indicates the duct through which the material is discharged into the top of the bell which is designated 7. The bell is supported by and extends down into the receptacle 35 which is substantially identical in shape with that shown in Figure 4, and it is provided with water inlet nozzle 36 which preferably operates continuously, there being also provided a flushing nozzle 37 which operates intermittently under the control of the solenoid-actuated valve 38. There is also shown an auxiliary nozzle 39 in the upper part of the bell which is also controlled from the valve 38 through the branch pipe 40.

At the bottom of the bell is a grate-like or reticulated gate 41 pivotally supported at 42. Connected with the member 41 for actuation thereby is a lever 43 to which is connected a vertically extending rod 44 that passes through the top of the enclosure for the receptacle and which is provided with a counterweight 45. The end of the rod 44 preferably terminates in a handle 46.

The arrangement is such that the fine material falling through the bell into the bottom of the receptacle may pass through the grate-like closure or gate 41. The larger solids will collect on the grate and may eventually accumulate to an extent that none of the fine material can pass through the grate. When sufficient material has accumulated on the gate, the gate will swing down against the action of the counterbalance, raising the rod 44 and the counterbalance.

The movement of the gate is utilized to close a switch for operating the solenoid valve 38. In the arrangement illustrated a lever 47 in the shape of a bell crank is pivotally attached to the side of the bell 7 with one end in the path of travel of the counterweight 45. The other end operates a circuit closer. The circuit closer may comprise a mercury tube switch mounted on the lateral arm of the lever 47, as indicated at 48. When the gate 41 swings down lifting the counterbalance 45, a circuit is closed through the switch 48 to actuate the solenoid valve 38. The high pressure jet of water discharged from the nozzle 37 passes through the openings in the gate, clearing away the accumulated material, and also tending to close the gate. When the accumulated materials have been swept away, the counterbalance will cause the gate 41 to swing back to the closed position. This will break the circuit through the solenoid and the valve 38 will close. The action of the unit is the same as the action of the unit shown in Figure 4.

While both Figures 4 and 6 disclose a nozzle opening into the upper part of the bell and no such nozzle is shown in Figure 2, it is contemplated that such an auxiliary nozzle may be provided in the bell of Figure 2 should it be desired, and it is also contemplated that this nozzle may or may not be used, as occasion may demand, in the arrangement shown in Figures 4 and 6. The construction of the unit in each case is such that should it be necessary the bell can be lifted out of the receptacle after the pipe 5 has been disconnected.

The method and system as herein described simplifies the problem of taking care of the dust that accumulates in the separator. While it is especially applicable for use with flue dust resulting from the operation of powdered coal burning boilers, it is equally applicable to many systems where dust is collected out of a stream of air or gases, and where the dust is of a nature that it may subsequently be brought into contact with water. The evacuating unit itself comprising the bell and receptacle is of simple construction. While we have shown certain specific forms of the evacuating device, it will, of course, be appreciated that various changes may be made in the shape of the parts comprising an evacuator and that various changes and modifications may otherwise be made in the actual construction of the parts within the contemplation of our invention and within the scope of the following claims.

We claim:

1. Apparatus of the class described comprising a duct leading from a dust collector through which the dust from the collector will fall by gravity, a receptacle at the lower end of said duct providing a water seal therefor and means for maintaining a flow of water through the receptacle, the lower end of said duct terminating above the water seal in a bell of substantially larger diameter than the remaining part of the duct.

2. Apparatus for receiving and disposing of dust which is precipitated into a dust collector comprising a duct adapted to be attached to the dust discharge portion of a dust collector and which is hermetically sealed to the dust collector and having an inclination such that material will flow therethrough by gravity, a fixed receptacle having water therein into which the bottom end of said duct discharges, the water in the receptacle providing a seal for said duct, means for continuously agitating the water in the receptacle and an overflow from the receptacle for maintaining a normal liquid level in the receptacle above the lowermost terminal of the duct, the bottom terminal portion of the duct being in the form of a bell of larger diameter than the remaining part of the duct, the top of the bell being above the maximum depth of liquid which enters the duct.

3. Apparatus of the class described for connection between the dust discharge end of a dry dust collector and a sewer or other liquid disposal line comprising a duct of sufficient vertical inclination for material to flow from the dust collector therethrough by gravity, a bell of enlarged diameter forming the lower terminal portion of said duct, a fixed receptacle into which the lower end of the bell projects, the receptacle having an overflow port therein above the bottom of said bell and below the top of the bell adapted to be connected with a sewer or disposal line, and a water inlet nozzle opening into the receptacle, said nozzle being adjacent the bottom of the receptacle and being positioned to direct the stream of water across the bottom of the receptacle under the bell.

4. A dust evacuating means for dust collectors comprising a sealed duct adapted to be connected to the discharge of a dust collector for receiving dust from the collector, a receptacle into which said duct projects and which is arranged to hold a body of water to form a water seal at the discharge end of the duct, said receptacle having a sloping bottom portion leading to a discharge orifice, an overflow pipe connected to the discharge orifice and a nozzle in the receptacle opposite said inclined portion for directing a current of water across the receptacle below the discharge end of the duct and up said inclined portion, the receptacle having a baffle depending therefrom across said discharge orifice but above the normal liquid level within the receptacle whereby a draft action may be created in the discharge pipe when a surge of water is created by said nozzle for flushing the receptacle.

5. A dust evacuating means for dust collectors comprising a sealed duct adapted to be connected to the discharge of a dust collector for receiving dust from the collector as it is precipitated therein, a receptacle into which the lower end of said duct projects and which is arranged to hold a body of water to form a water seal at the discharge end of the duct, said receptacle having a sloping bottom portion leading to a discharge orifice, an overflow pipe connected to the discharge orifice and a nozzle in the bottom of the receptacle opposite said inclined portion for directing a current of water across the bottom of the receptacle and up said inclined portion, the receptacle having a baffle depending therefrom across said overflow but above the normal liquid level within the receptacle whereby draft action may be created in the discharge pipe when a surge of water is created by said nozzle for flushing the receptacle, the lower end of said duct being in the form of a bell of a larger diameter than the remainder of the duct.

6. A dust evacuating means for dust collectors comprising a sealed duct adapted to be connected to the discharge of a dust collector for receiving dust from the collector as it is precipitated therein, a receptacle into which the lower end of said duct projects and which is arranged to hold a body of water to form a water seal at the discharge end of the duct, said receptacle having a sloping bottom portion leading to a discharge orifice, an overflow pipe connected to the discharge orifice and a nozzle in the bottom of the receptacle opposite said inclined portion for directing a current of water across the bottom of the receptacle and up said inclined portion, the receptacle having a baffle depending therefrom across said overflow but above the normal liquid level within the receptacle whereby a draft action may be created in the discharge pipe when a surge of water is created by said nozzle for flushing the receptacle, and means for introducing water into said bell above the normal liquid level in the bell.

7. A dust evacuating means for dust collectors comprising a sealed duct adapted to be connected to the discharge of a dust collector for receiving dust from the collector as it is precipitated therein, a receptacle into which the lower end of said duct projects and which is arranged to hold a body of water to form a water seal at the discharge end of the duct, said receptacle having a sloping bottom portion leading to a discharge orifice, a nozzle in the bottom of the receptacle opposite said inclined portion for directing a current of water across the bottom of the receptacle and up said inclined portion, and means including a movable element within the receptacle in the path of the material falling into the receptacle for automatically effecting control of the discharge of water through said nozzle.

8. Flue dust disposal means comprising a duct adapted to be sealed to the discharge of a dust collector, a bell of greater diameter than the duct at the lower end of the duct and into which the duct is sealed, a receptacle of substantially larger diameter than the bell into which the bell extends, said receptacle having an overflow above the lower end of the bell and below the top of the bell, and means for introducing water into the receptacle in such manner as to agitate the dust that falls into the receptacle.

9. Flue dust disposal means comprising a duct adapted to be sealed to the discharge of a dust collector, a bell of greater diameter than the duct at the lower end of the duct and into which the duct is sealed, a fixed receptacle of substantially larger diameter than the bell into which the bell extends, said receptacle having an overflow above the lower end of the bell and below the top of the bell, and a nozzle opening into the receptacle for supplying water to the receptacle and agitating the dust and water.

10. For use with a dry dust collector having a hopper at the bottom thereof and in which a pressure other than atmospheric pressure is maintained, the combination comprising a duct sealed to the bottom of the hopper, a bell having a top portion into which the duct opens and which is of a diameter substantially larger than the duct, a receptacle into which the bell extends, the receptacle having an overflow above the bottom of the bell and below the top thereof whereby a liquid seal may be maintained at the bottom of the bell and the dust particles may gravitate through the duct into the water at the bottom of the bell in a quiescent atmosphere, and means for injecting the water into the receptacle in such manner as to maintain a zone of agitation under the bell.

11. Flue dust disposal means comprising a duct adapted to be sealed to the discharge of a dust collector, a bell of greater diameter than the duct at the lower end thereof and into which the duct is sealed, a water retaining receptacle into the lower end of which said duct projects, said receptacle having a discharge orifice at one side thereof and above the lower end of the said duct so as to form a water seal at said end of the duct, said receptacle having a sloping bottom portion leading to the said discharge orifice, and means in the receptacle to direct a current of water across the receptacle below the lower end of said duct and up said sloping bottom portion to the discharge orifice.

THORLEIF THORSTEN.
JOHN E. GEUE.
ROLLAND F. KELLOGG, Sr.